US008645950B2

(12) United States Patent
Fries et al.

(10) Patent No.: US 8,645,950 B2
(45) Date of Patent: Feb. 4, 2014

(54) VIRTUAL MACHINE IMAGE ANALYSIS

(75) Inventors: Robert Fries, Kirkland, WA (US); Srivatsan Parthasarathy, Seattle, WA (US); Galen Hunt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 156 days.

(21) Appl. No.: 13/171,366

(22) Filed: Jun. 28, 2011

(65) Prior Publication Data

US 2013/0007732 A1 Jan. 3, 2013

(51) Int. Cl.
*G06F 9/46* (2006.01)

(52) U.S. Cl.
USPC .......................................................... 718/1

(58) Field of Classification Search
None
See application file for complete search history.

(56) References Cited

U.S. PATENT DOCUMENTS

| | | | |
|---|---|---|---|
| 2005/0198303 A1 | 9/2005 | Knauerhase | |
| 2006/0277542 A1 | 12/2006 | Wipfel | |
| 2007/0162521 A1 | 7/2007 | Raghunath | |
| 2008/0256534 A1 | 10/2008 | Chess et al. | |
| 2008/0263258 A1 | 10/2008 | Allwell et al. | |
| 2008/0307414 A1 | 12/2008 | Alpern | |
| 2009/0070752 A1 | 3/2009 | Alpern | |
| 2009/0198731 A1* | 8/2009 | Noonan, III | 707/104.1 |
| 2009/0249284 A1 | 10/2009 | Antosz | |
| 2010/0257523 A1 | 10/2010 | Frank | |
| 2011/0035747 A1 | 2/2011 | Machida | |

OTHER PUBLICATIONS

Wang et al. (Automatic Miconfiguration Troubleshotting with peerpressure, Nov. 2004).*
How to create a Virtual PC hard disk image by using a backup disk image file Date Published Dec. 19, 2007.
OS-level Virtualization and Its Applications Author: Yang Yu Published Dec. 2007.
"International Search Report", Mailed Date: Jan. 7, 2013, Application No. PCT/US2012/041700, Filed Date: Jun. 8, 2012, pp. 9.

* cited by examiner

*Primary Examiner* — Emerson Puente
*Assistant Examiner* — Sisley Kim

(57) ABSTRACT

Techniques for analyzing virtual machine images are described. In one embodiment, a subset of settings is extracted from one or more virtual machine images, the virtual machine images store therein values of the settings. The settings are used by software executing in virtual machines of the virtual machine images, respectively. A target one of the virtual machine images is selected and target values of the settings are obtained from the target virtual machine image. Sample values of the settings are obtained from a plurality of virtual machine images. The subset formed by identifying similarities and differences of the values between the virtual machine images.

17 Claims, 8 Drawing Sheets

290

| setting | target machine value | VM1 value | ... | VMN value |
|---|---|---|---|---|
| search-provider | engine1 | engine1 | ... | engine3 |
| installDir | /this | /this | ... | /this |
| memSize | 1000 | 1200 | ... | 4000 |
| registryKeyX | "aaa" | "bbb" | ... | "ccc" |

FIG. 7

VIRTUAL MACHINE IMAGE ANALYSIS

BACKGROUND

In the field of managing software on virtual machines, the large number of variables in a virtual machine guest operating system can make it difficult for a person to distinguish between software settings that are relevant or significant with respect to some arbitrary purpose. For example, a person experimenting with the configuration settings of a guest operating system (of a virtual machine) and or application software installed thereon may, over time, make many configuration changes, for example directly by manual editing, as side effects to tasks such as installing or uninstalling software, and so forth. As these configuration or setting changes accumulate, it can be difficult to retrace one's steps and identify what may have caused a virtual machine to begin operating in a desirable or undesirable state.

Not only can it be difficult to identify, among the many changing state parameters of a virtual machine, those that have meaning or significance, it can also be difficult to distinguish between different types or categories of changeable values on a virtual machine. Some may be true configuration parameters that a guest operating system or application software may read to determine how to function. Others may contain operational data that is outputted by the guest operating system, such as performance metrics, timestamps, usage counts, and so forth. Even among these, it may be difficult to determine, for purposes of evaluating a virtual machine, operational data that is correlated with the virtual machine's desirable or undesirable current state, and operational data that is effectively independent of the virtual machine's state.

Techniques related to using peer-pressure type algorithms to analyze virtual machine images are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques for analyzing virtual machine images are described. In one embodiment, a subset of settings is extracted from one or more virtual machine images, the virtual machine images store therein values of the settings. The settings are used by software executing in virtual machines of the virtual machine images, respectively. A target one of the virtual machine images is selected and target values of the settings are obtained from the target virtual machine image. Sample values of the settings are obtained from a plurality of virtual machine images. The subset formed by identifying similarities and differences of the values between the virtual machine images. Similarities and differences may be statistically analyzed, for example, using Bayesian estimations.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 7 shows an example database of settings and values.

DETAILED DESCRIPTION

Embodiments discussed below relate to analyzing virtual machine images. As mentioned in the Background, it can be difficult for a user to sift through the many observable values on a virtual machine to identify which values are for settings or parameters that are of interest and those that are of little interest. To identify meaningful settings from among the many that may be present on a virtual machine, Bayesian-based peer-pressure techniques are used to rank and categorize parameters or settings of a virtual machine. Discussion will proceed with an over view of machine virtualization, followed by a discussion of peer-pressure algorithms, followed by explanation of how peer-pressure algorithms are applied to data extracted from virtual machine images.

Figure 1:
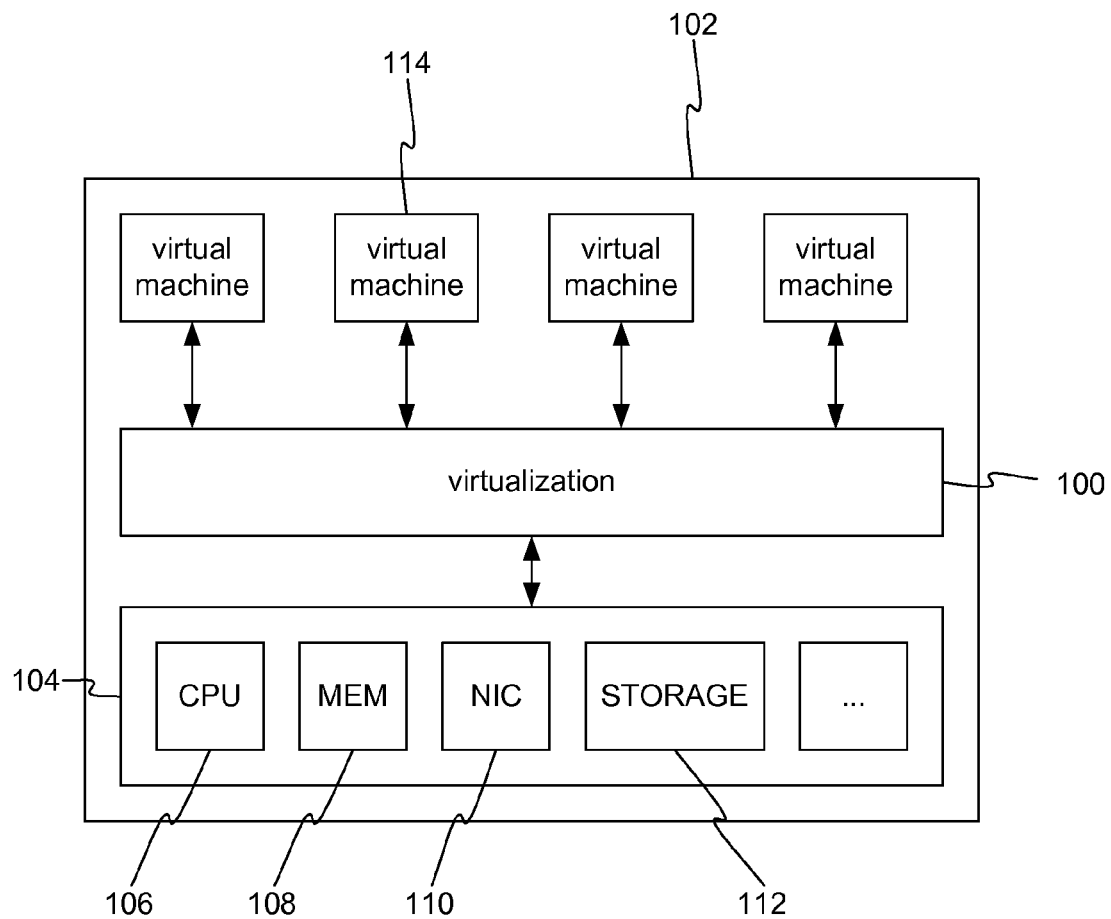
FIG. 1 shows an example virtualization layer.

FIG. 1 shows an example virtualization layer 100. A computer 102 has hardware 104, including a central processing unit (CPU) 106, memory 108, a network interface 110, non-volatile storage 112, and other components not shown, such as a bus, a display adapter, etc. The virtualization layer 100 manages and facilitates execution of virtual machines 114. Although not shown in FIG. 1, each virtual machine 114 typically has an associated virtual disk image and a guest operating system. For brevity, the operating system and perhaps application software of a virtual machine 114 will sometimes be referred to as a guest, which is stored and executed from the virtual disk image associated with the virtual machine 114.

The virtualization layer 100 may be of any variety of known or future implementations, such as Hyper-V Server™, VMWare ESX Server™, Xen, Oracle VM™, etc. The architecture of the virtualization layer may a hosted type, with a virtual machine monitor (VMM) running on a host operating system, or a bare-metal type with a hypervisor or the like running directly on the hardware 104 of the computer 102. As used herein, the term "virtual machine" refers to a system-type virtual machine that simulates any specific hardware architecture (e.g., x86) able to run native code for that hardware architecture; to the guest, the virtual machine may be nearly indistinguishable from a hardware machine. Virtual machines discussed herein are not abstract or process-type virtual machines such as Java Virtual Machines.

The virtualization layer 100 performs the basic function of managing the virtual machines 114 and sharing of the hardware 104 by both itself and the virtual machines 114. Any of a variety of techniques may be used to isolate the virtual machines 114 from the hardware 104. In one embodiment, the virtualization layer may provide different isolated environments (i.e., partitions or domains) which correspond to virtual machines 114. Some of the virtualization layer 100 such as shared virtual device drivers, inter virtual machine communication facilities, and virtual machine management APIs (application programming interfaces), may run in a special privileged partition or domain, allowing for a compact and efficient hypervisor. In other embodiments, functionality for virtual machine management and coherent sharing of the hardware 104 may reside in a monolithic on-the-metal hypervisor.

Figure 2:
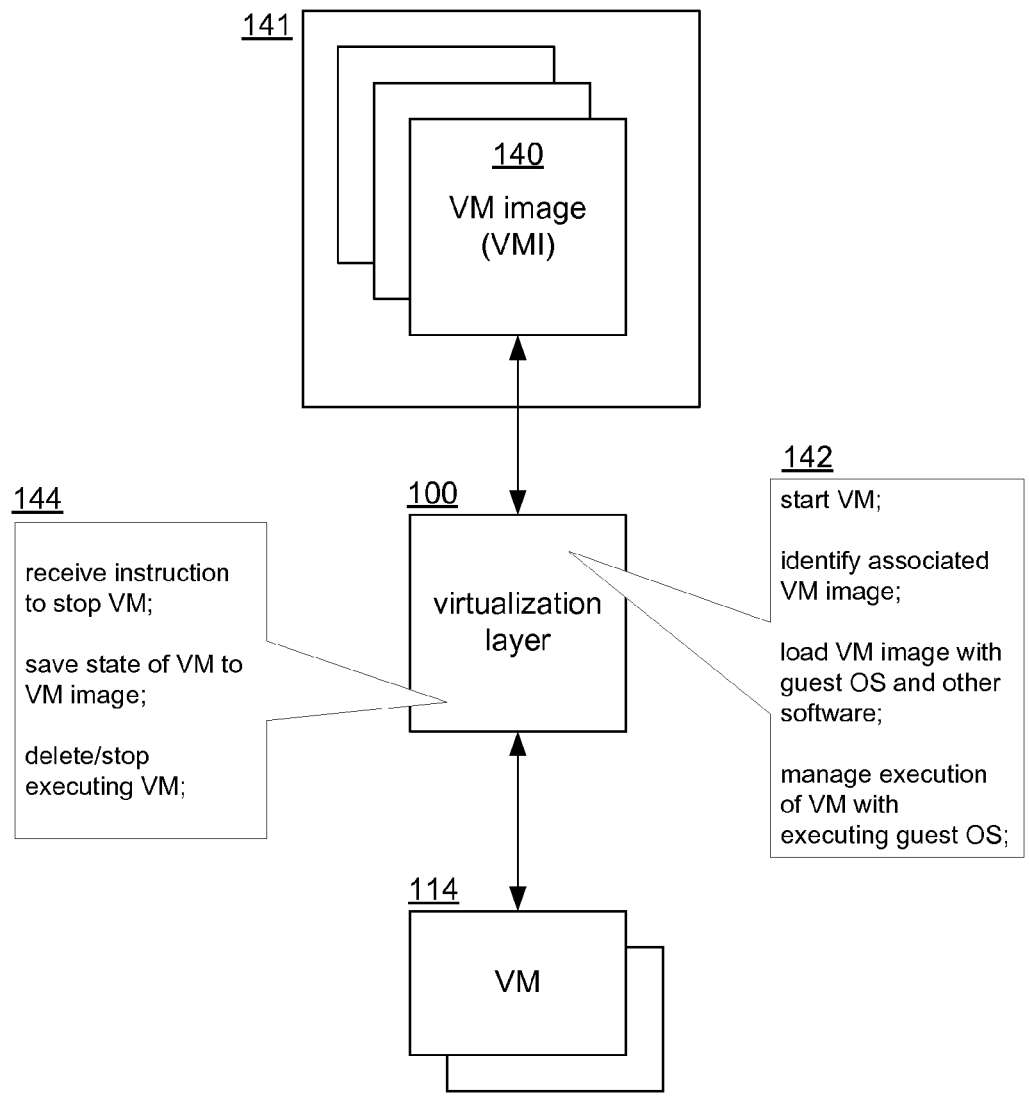
FIG. 2 shows processes and interactions of virtualization layer in relation to virtual machines and virtual machine images.

FIG. 2 shows processes and interactions of virtualization layer 100 in relation to virtual machines 114 and virtual machine images 140. The virtualization layer 100 performs a process 142 of starting and executing a virtual machine 114, possibly according to corresponding virtual machine configuration parameters. When a virtual machine 114 (VM) is started, the virtualization layer identifies an associated virtual machine image 140. In practice, any virtual machine image 140 can be used by any virtual machine 114. The virtual machine image 140 may be a specially formatted file (e.g., a VHD) on a file system 141 of the virtualization layer 100. The virtualization layer 100 loads the identified virtual machine image 140. The started virtual machine 114 mounts and reads the virtual machine image 140, perhaps seeking a master boot record or other boot information, and boots a guest operating system which begins executing.

The virtualization layer 100 manages execution of the virtual machine 114, handling certain calls to the guest's kernel, hypercalls, etc., and coordinating the virtual machine 114's access to the underlying hardware 104. As the guest and its software run, the virtualization layer 100 may maintain state of the guest on the virtual disk image 140; when the guest, or an application run by the guest, writes data to "disk", the virtualization layer 100 translates the data to the format of the virtual disk image 140 and writes to the image.

The virtualization layer 100 may perform a process 144 for shutting down the virtual machine 114. When an instruction is received to stop the virtual machine 114, the state of the virtual machine 114 and its guest is saved to the virtual disk image 140, and the executing virtual machine 114 process (or partition) is deleted. A specification of the virtual machine 114 may remain for a later restart of the virtual machine 114.

Figure 3:
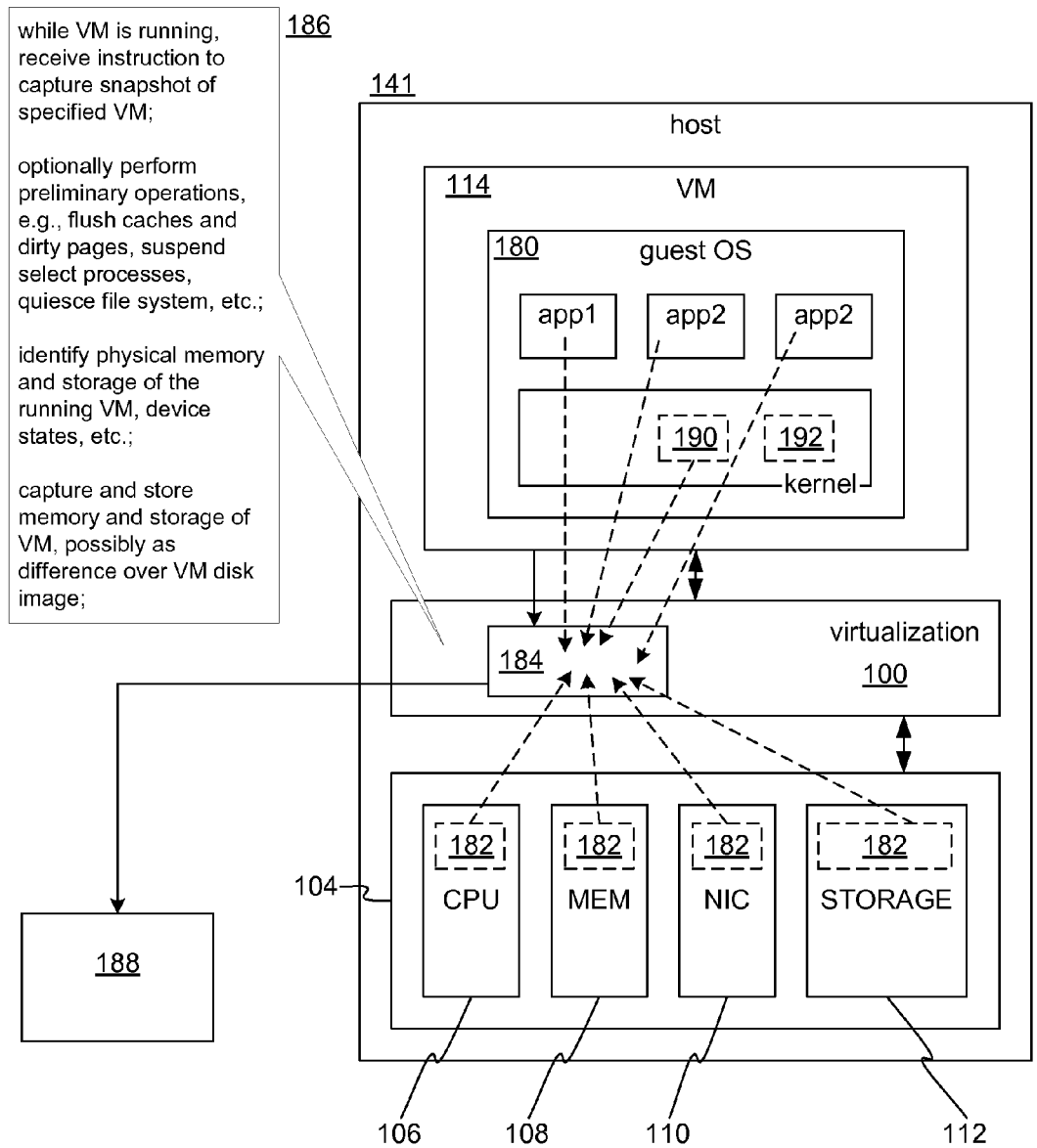
FIG. 3 shows how a snapshot of an executing virtual machine may be captured.

FIG. 3 shows how a snapshot of an executing virtual machine 114 may be captured. The virtual machine 114 has a guest operating system 180 executing thereon using the hardware 104. The running virtual machine 113 provides virtual disk storage that stores the guest operating system 180 and any applications or other software installed thereon. In sum state 182 of the guest operating system 180 and applications may physically exist throughout the hardware 104, as managed by the virtualization layer 100. In sum, nearly any known hardware or software feature of a physical machine may have an equivalent on the virtual machine 114. The virtualization layer 100 includes a snapshotting component 184 that performs a process 186 to capture a snapshot 188. While the virtual machine 114 is running, and instruction is received to capture a snapshot of the virtual machine 114. For example, a virtualization management system may transmit an instruction across a network that is received by the virtualization layer 100. In some virtualization implementations, before a snapshot is captured, some preliminary preparation may be required. For example caches may require flushing, a file system or storage system may need to be quiesced, memory pages of the guest operating system 180 may need to be stored, and so forth.

Capturing a snapshot 188 may be performed with known techniques or with existing implementations of virtualization technology. Notably, snapshot 188 may include any information available in an equivalent running physical machine. For example, snapshot 188 may include a copy of the memory of the virtual machine 113, which may include executing processes 190, kernel data structures 192, or any information in the virtualized physical memory of the virtual machine 113. In addition, the snapshot 188 may include information captured from physical or virtual devices used by the virtual machine 113, including register values, buffer contents, etc. In some implementations, the snapshotting process 186 may also capture information about the virtual physical environment of the virtual machine 113, such as virtual CPU information (number of virtual cores or CPUs), amounts of memory and storage, virtual devices, virtual network interface cards, BIOS, virtual mother board, device drivers, and others. Some virtualization implementations may link a snapshot to the virtual machine's disk image, and the snapshot may comprise storage blocks of the executing virtual machine that differ from the virtual machine's disk image. In sum, snapshot 188 is a persistent object such as a file that contains the captured working state of a virtual machine. Most virtualization implementations allow a snapshot to be loaded and executed; the virtual machine executing the snapshot (possible a virtual machine other than the original from which the snapshot was captured) begins executing as though the original virtual machine at the time the snapshot was taken. In other words, the state of an executing virtual machine may be captured and later resumed in the same or a new virtual machine.

It should be noted that in some virtualization implementations, snapshots and disk image files are functionally interchangeable. Therefore, as used herein, the term "virtual machine image" will refer to both special-format files that a virtualization layer provides as a virtual disk to a virtual machine, as well as snapshots captured from executing virtual machines.

Figure 4:
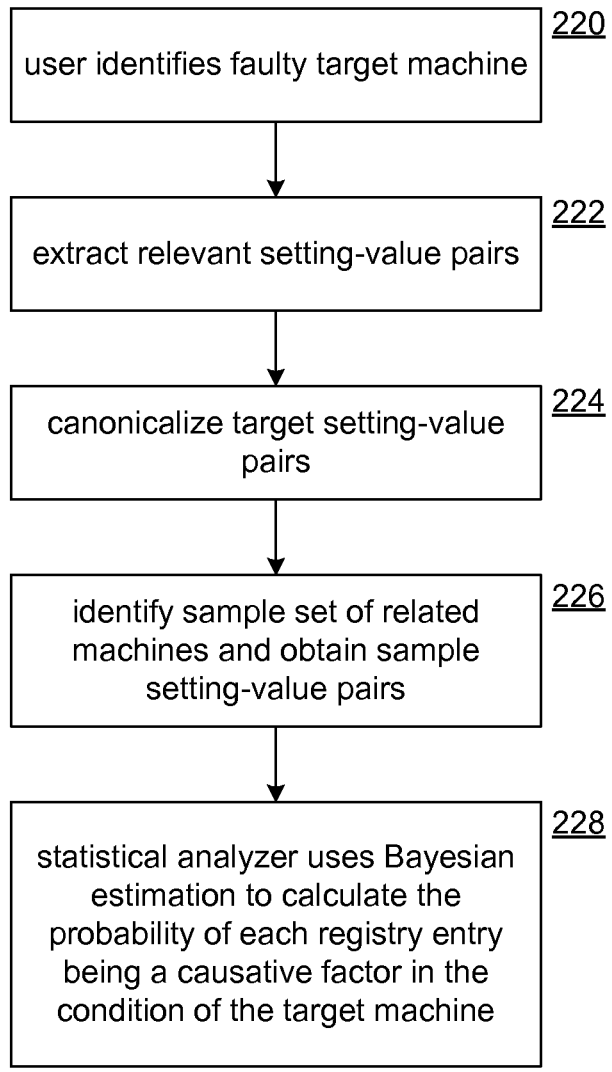
FIG. 4 shows a generic peer-pressure algorithm.

FIG. 4 shows a generic peer-pressure algorithm. A peer-pressure algorithm as applied to diagnosing faulty machines is described in detail in "Automatic Misconfiguration Troubleshooting with PeerPressure" (H. Wang, J. Platt, Y. Chen, R. Zhang, and Y.-M. Wang; USENIX OSDI, 2004). The aforementioned reference is incorporated by reference herein. The following discussion of FIG. 4 summarizes and generalizes the algorithm described in the cited reference.

At a step 220, a target machine is selected by a user, for instance, a faulty machine. At step 222, target relevant setting-value pairs are extracted. In general, any type of setting-value pairs locatable in a virtual machine image may be extracted (as used herein, "setting" will also refer to operational state or write/output data, such as log files or any guest/application state or output that is persisted to a virtual machine image). For example, a setting-value pair may be a registry key and its content (value), a file directory and the name of a file in the directory, a file and the first line of the file, a log file and the number of lines in the log file, a virtualization parameter (e.g., memory allocation) and its value, and so forth. That is, the setting, or parameter, is some information that identifies the location on the virtual machine image from which the corresponding value came, and the value is the content at that location.

At step 224, the target setting-value pairs may be canonicalized. This merely involves putting the settings and values in some canonical form to allow them to be accurately compared, semantically. For example, variations in spelling or form may be corrected (e.g., "#1", might be converted to "1"), values might be anonymized, and so forth.

At step 226, a sample set of related virtual machines is identified and a sample set of setting-values pairs (or just values) corresponding to the settings from step 222 are obtained. The virtual machines may be identified on any basis, perhaps user-defined. For example, virtual machines that are based on a same virtual machine image such as a golden image may be selected. Virtual machines that have a same application may be identified. A set of virtual machines selected by a use may be identified. The values are then extracted. The values may be pre-extracted from virtual machine images of the identified virtual machines and then stored in canonical form in a database (see FIG. 7), from where they are obtained when needed. The values may also be extracted directly from virtual machine images and canonicalized as they are needed.

At step 228, the peer-pressure algorithm performs statistical analysis to derive information about the settings. That is, calculations are performed to help identify which settings are likely to be of interest to the target machine (from step 220), and which are likely not to be of interest. In other words, the statistical calculation winnows out settings that are found to have low likelihood of substantively affecting (or signaling) the behavior of the target virtual machine relative to sampled virtual machines. While details are provided in the above-referenced paper, some explanation follows.

The general idea is that, for some given settings, values of the settings are compared among the virtual machines. A setting that has values that tend to be highly uniform across all the machines is not likely to be a setting that affects machine behavior or that serves as a telltale of machine behavior. A setting that has values that tend to be highly non-uniform is also not likely to be behavior-controlling or behavior-indicating. In other words, if all of the virtual machines have a different value for a given setting, the setting is not likely to affect or predict a trait of the target virtual machine. In the middle are settings whose values are somewhat uniform but vary with some statistical significance. For example, if half or a third of machines have a different value for a setting, and the rest have a same value, then it is likely that the setting is being purposefully altered and with effect. The estimation step 228 eliminates the highly uniform and highly non-uniform settings to identify a subset of settings that may be of interest to a user. In one embodiment, Bayesian statistical estimations are used, as fully explained in the above-included paper.

Figure 5:
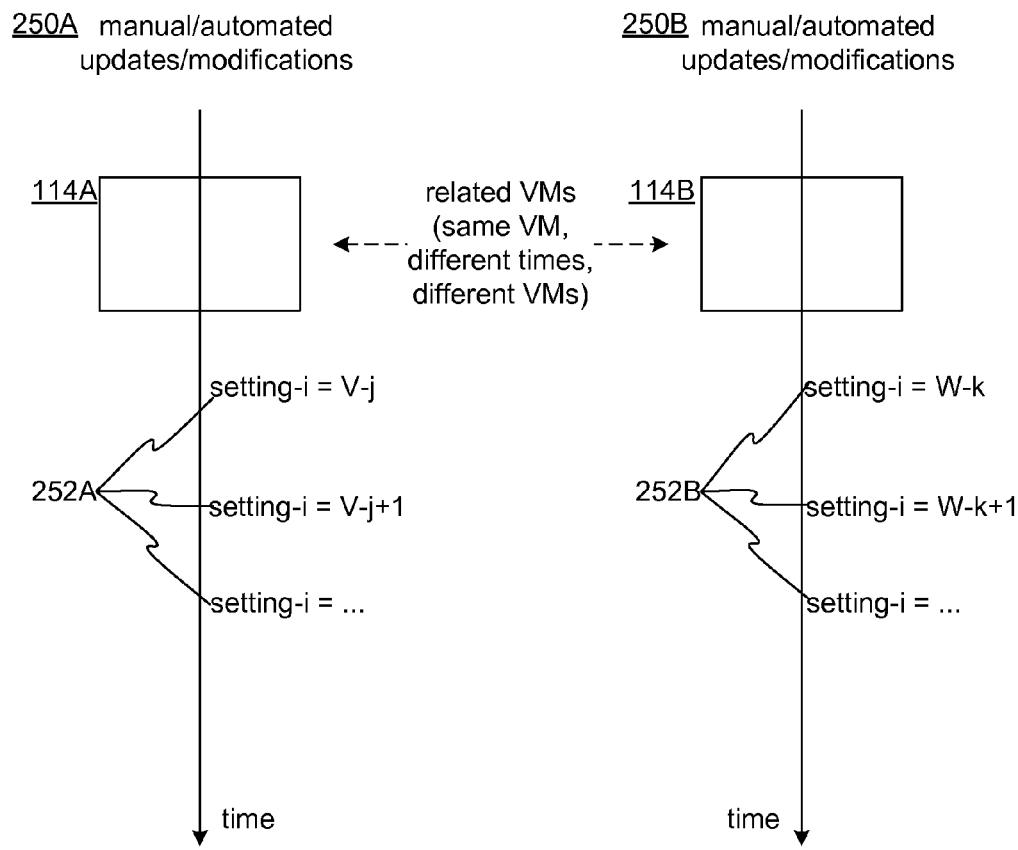
FIG. 5 shows different approaches for obtaining settings.

FIG. 5 shows different approaches for obtaining settings. In one embodiment, a virtual machine 114A is related to a virtual machine 114B. They may be related in that both have virtual machine images that are derived from a same base or "golden" virtual machine image. They may be related in time; one may be a version of the other at a later time (either as a direct descendant or as a clone/snapshot of the other), and so forth. They may be related in that they both have a same software installation, guest operating system, etc. Over time, virtual machines 114A, 114B are subject to modifications, updates, configuration edits, and other persistent state changes as reflected in the respective virtual machine images. For example, both virtual machines 114A, 114B may have an instance of a same setting such as setting 252A, 252B ("setting-i"). Over time, the settings 252A, 252B may take on different values. If a single virtual machine is snapshotted or captured/copied over time, those instances may serve as the sample set (see step 226 above) and a virtual machine in that lineage may serve as the target virtual machine. That is, the values at different times of the same settings of a same virtual machine may serve as the sample set.

Figure 6:
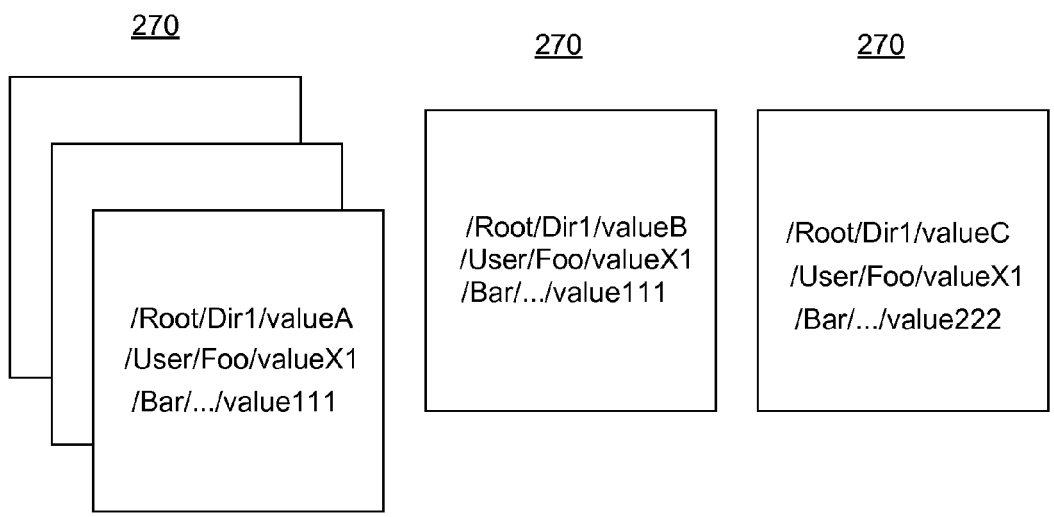
FIG. 6 shows example settings in virtual machine images.

FIG. 6 shows example settings in virtual machine images 270. As noted earlier, these settings may be any persistent addressable value in a virtual machine image. For example, file system objects, registry entries, virtual machine metadata (e.g., in a header of a virtual machine image), and so forth. The values of the settings may change over time and may vary in how uniform the values are across a sample space. Some settings may have highly uniform values, and some values may have highly non-uniform values (for example, values that reflect the "character" of a particular machine, such as a hostname, a network address, a user name, etc.).

FIG. 7 shows an example database 290 of settings and values. The column labels such as "setting" are self-explanatory. In this example, each virtual machine in the available population has its own column or vector of values. In practice, the number of settings (rows) may run into the tens of thousands or more. It should be noted that for some settings, values may be mostly uniform across the virtual machines, for instance, the "installDir" setting has the same value for each virtual machine. Other settings may have highly non-uniform values. For example, "registryKeyX" has a different value for each respective machine. Other settings may have values that are neither highly uniform nor highly non-uniform; Bayesian statistical analysis with implementation-specific parameters may be used to identify which of the settings are likely to be of interest. In one embodiment, a multi-dimensional database is used. For example, values of a same machine may be indexed over different times, different revisions.

Figure 8:
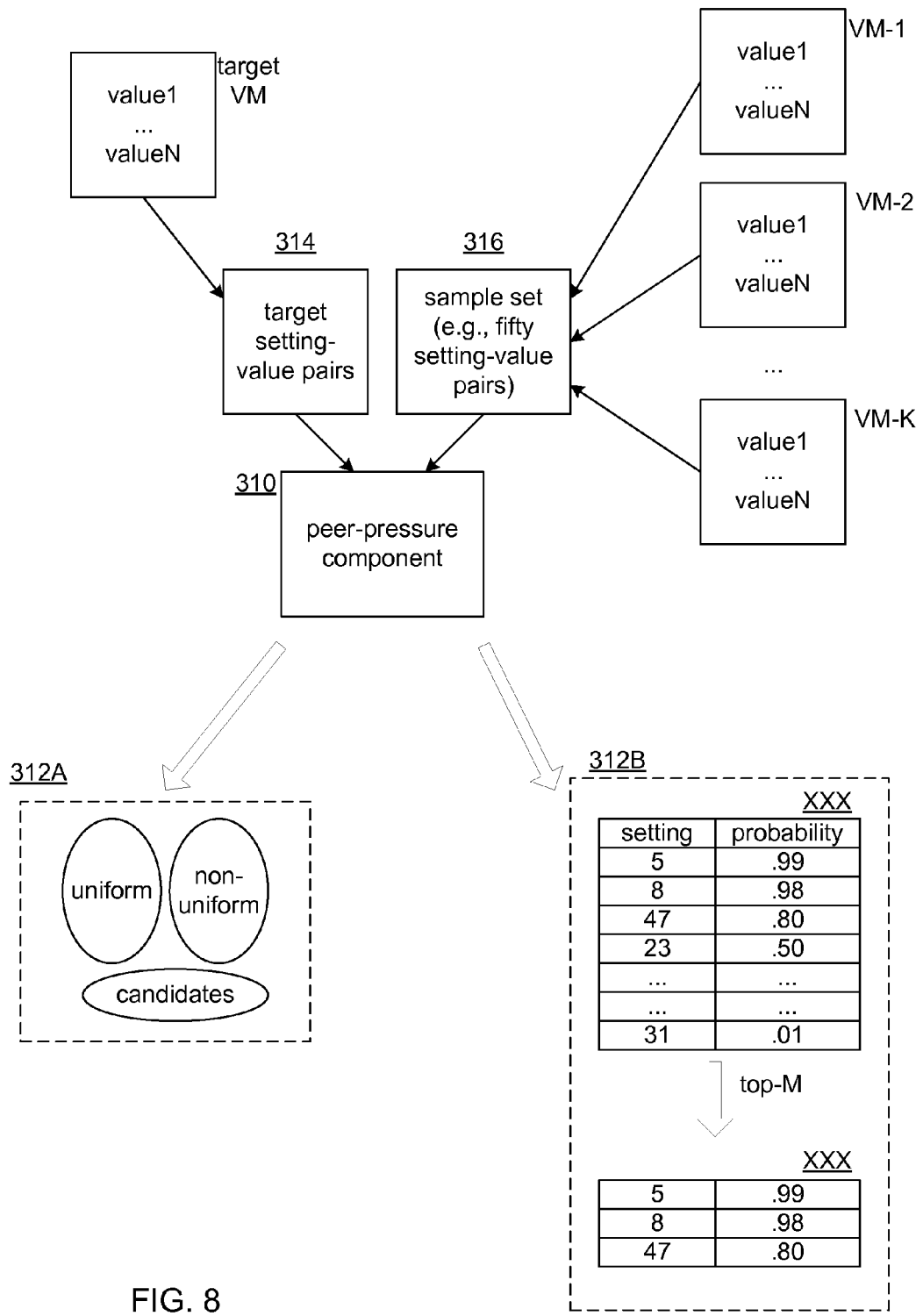
FIG. 8 shows a system using a peer-pressure component and example outputs.

FIG. 8 shows a system using a peer-pressure component 310 and example outputs 312A, 312B. The peer-pressure component 310 is passed a target set 314 of target setting-value pairs (or just the values if a constant set of settings is to be used). A sample set 316 is also passed to the peer-pressure component 310. The peer-pressure component 310 performs statistical analysis on the inputs to generate an output, which may be stored in recording media, displayed on a display, transmitted via network, etc. In one embodiment, the output 312A is a set of categorized settings such as settings deemed uniform, settings deemed non-uniform, and those deemed to be settings that are candidates of interest. In another embodiment, the output 312B is a set of probability-ranked settings from among the inputted target setting-value pairs 314. The output 312B may be reduced to a top-M (e.g., the top three) set of the ranked settings. A probability threshold may be used instead.

It will be appreciated that variations and alternative embodiments are contemplated and encompassed by the claims below.

Conclusion

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method comprising:
  selecting a subset of settings corresponding to values extracted from a plurality of virtual machine images, the plurality of virtual machine images comprising respective file systems comprised of files storing therein the values of the settings, the values of the setting controlling software in the virtual machine images, respectively;

selecting a target one of the plurality of virtual machine images and obtaining target values of the settings from the target virtual machine image, the target values having been obtained by parsing files of the file system of the target virtual machine image to identify the settings and to extract the target values from the files, the settings occurring among each of the plurality of virtual machine images;

accessing, in response to obtaining the target values, sample values of the settings, the sample values having been obtained from the plurality of virtual machine images by parsing through the files of the file systems of the plurality of virtual machine images to identify the settings and to extract the sample values of the settings; and forming, in response to obtaining the sample values of the settings, the subset by identifying similarities and differences of the target and sample values between the plurality of virtual machine images based on a statistic function.

2. A method according to claim 1, wherein the statistic function comprises a Bayesian function, the method further comprising executing a peer-pressure algorithm comprised of the Bayesian statistic functions that operates on counts of the similarities and differences.

3. A method according to claim 1, wherein the target virtual machine image comprises a user-selected virtual machine image, and the plurality of virtual machine images are related to each other and the target virtual machine image.

4. A method according to claim 3, wherein the plurality of virtual machine images and the target virtual machine image are related as being copies of a same virtual machine image at different points in time.

5. A method according to claim 3, wherein the plurality of virtual machine images and the target virtual machine image are related as having originally been copies of a same virtual machine image.

6. A method according to claim 5, wherein the plurality of virtual machine images have executed as virtual machines and at least some of the values were generated while the virtual machine images were executing as virtual machines.

7. A method according to claim 1,
wherein the sample values obtained from sample virtual machines by extracting the sample values from files of the sample virtual machines, and the sample virtual machines comprise snapshots taken of a same executing virtual machine at different points in time.

8. A method according to claim 1, wherein the forming the subset by identifying comprises performing statistical calculations according to degree of agreement between the sample values and the target values.

9. A method according to claim 1, further comprising determining whether to include a given one of the settings in the subset based on a degree to which sample values of the given setting are in agreement.

10. A method according to claim 9, wherein the given setting is included in the subset when the sample values are determined to have sufficient statistical agreement.

11. A method according to claim 10, wherein a specific value is determined for the sample values in statistical agreement and the determining is based on the given value differing from the specific value.

12. A method according to claim 1, wherein the settings comprise configuration settings of software on the virtual machines.

13. A method according to claim 1, further comprising ranking the settings according to the values.

14. One or more computer-readable storage hardware devices storing information to enable a computer device to perform a process, the process comprising:

selecting a subset of settings corresponding to values extracted from a plurality of virtual machine images, the plurality of virtual machine images comprising respective file systems comprised of files storing therein the values of the settings, the values of the setting controlling software in the virtual machine images, respectively;

selecting a target one of the plurality of virtual machine images and obtaining target values of the settings from the target virtual machine image, the target values having been obtained by parsing files of the file system of the target virtual machine image to identify the settings and to extract the target values from the files, the settings occurring among each of the plurality of virtual machine images;

accessing, in response to obtaining the target values, sample values of the settings, the sample values having been obtained from the plurality of virtual machine images by parsing through the files of the file systems of the plurality of virtual machine images to identify the settings and to extract the sample values of the settings; and forming, in response to obtaining the sample values of the settings, the subset by identifying similarities and differences of the target and sample values between the plurality of virtual machine images based on a statistic function.

15. One or more computer-readable storage hardware devices according to claim 14, wherein the statistic function comprises a Bayesian statistic function includes a peer pressure algorithm identifies the subset according the values, such that state parameters having values that are determined to correspond to a uniform category are not included in the subset, and state parameters having values that are determined to correspond to a non-uniform category are not included in the subset.

16. One or more computer-readable storage hardware devices according to claim 15, where state parameters having values that are not determined to be in either the uniform category or the non-uniform category are included in the subset of state parameters.

17. One or more computer-readable storage hardware devices according to claim 14, wherein the state parameters comprise configuration settings and operational states of software on the virtual machine images.

* * * * *